US012109616B2

(12) United States Patent
Polese et al.

(10) Patent No.: US 12,109,616 B2
(45) Date of Patent: Oct. 8, 2024

(54) METHOD AND SYSTEM FOR IMPROVING THE SURFACE FRACTURE TOUGHNESS OF BRITTLE MATERIALS, AND A CUTTING TOOL PRODUCED BY SUCH METHOD

(71) Applicants: University of the Witwatersrand, Johannesburg, Johannesburg (ZA); CSIR, Pretoria (ZA)

(72) Inventors: Claudia Polese, Johannesburg (ZA); Daniel Glaser, Johannesburg (ZA); Lesley A. Cornish, Johannesburg (ZA); Rodney M. Genga, Johannesburg (ZA)

(73) Assignees: University of the Witwatersrand, Johannesburg (ZA); CSIR, Pretoria (ZA)

( * ) Notice: Subject to any disclaimer, the term of this patent is extended or adjusted under 35 U.S.C. 154(b) by 569 days.

(21) Appl. No.: 16/617,335

(22) PCT Filed: May 28, 2018

(86) PCT No.: PCT/IB2018/053772
§ 371 (c)(1),
(2) Date: Nov. 26, 2019

(87) PCT Pub. No.: WO2018/215996
PCT Pub. Date: Nov. 29, 2018

(65) Prior Publication Data
US 2020/0102634 A1   Apr. 2, 2020

(30) Foreign Application Priority Data

May 26, 2017  (NL) ..................... 2018981

(51) Int. Cl.
*B22F 3/105*   (2006.01)
*B22F 3/24*    (2006.01)
(Continued)

(52) U.S. Cl.
CPC ............... *B22F 3/105* (2013.01); *B22F 3/24* (2013.01); *B22F 5/00* (2013.01); *C21D 10/005* (2013.01);
(Continued)

(58) Field of Classification Search
CPC ............ B22F 3/105; B22F 2003/1051; C22C 29/02–29/10; B23P 9/04; C21D 10/005
See application file for complete search history.

(56) References Cited

U.S. PATENT DOCUMENTS

2007/0108169 A1* 5/2007 Shimada ............... H02K 15/03
                                                 310/156.53
2010/0051141 A1* 3/2010 Bhambri ................ C21D 1/78
                                                 148/212
(Continued)

FOREIGN PATENT DOCUMENTS

CN    102470480 A  *  5/2012  ......... B23K 20/1255
CN    103614541 A  *  3/2014  ......... B23K 26/0622
(Continued)

OTHER PUBLICATIONS

JP2013-107143A English language translation (Year: 2013).*
(Continued)

*Primary Examiner* — Samir Shah
*Assistant Examiner* — Sean P. O'Keefe
(74) *Attorney, Agent, or Firm* — Foley Hoag LLP; Dana M. Gordon; Lawrence P. Tardibono

(57) ABSTRACT

Methods of improving the wear resistance of a cemented carbide are provided. The methods include using fracture toughness as a selection criterion and selecting a cemented carbide which has a fracture toughness between about 6 and about 15 MPa·m$^{1/2}$. Cutting tools and/or cutting tool inserts prepared using methods of the disclosure are also disclosed.

11 Claims, 12 Drawing Sheets

(51) Int. Cl.
  *B22F 5/00* (2006.01)
  *C21D 10/00* (2006.01)
  *C22C 29/06* (2006.01)
  *C22C 29/08* (2006.01)
  *C22F 3/00* (2006.01)

(52) U.S. Cl.
  CPC ............ *C22C 29/067* (2013.01); *C22C 29/08* (2013.01); *C22F 3/00* (2013.01); *B22F 2005/001* (2013.01); *B22F 2301/15* (2013.01); *B22F 2302/10* (2013.01)

(56) References Cited

U.S. PATENT DOCUMENTS

2011/0135414 A1* 6/2011 Pfeiffer .................... C21D 7/06
  264/293
2019/0001414 A1* 1/2019 Konyashin .............. C22C 29/06

FOREIGN PATENT DOCUMENTS

| CN | 105648201 A | * | 6/2016 | | |
|---|---|---|---|---|---|
| DE | 2007/000486 A1 | | 3/2009 | | |
| JP | 2003/113437 A | | 4/2003 | | |
| JP | 2005/272989 A | | 10/2005 | | |
| JP | 2006320907 A | * | 11/2006 | .......... | F16C 33/1075 |
| JP | 2009/012061 A | | 1/2009 | | |
| JP | 2013/107143 A | | 6/2013 | | |

OTHER PUBLICATIONS

JP-2006320907-A English language translation (Year: 2006).*
Li, Kangmei, Yongxiang Hu, and Zhenqiang Yao. "Experimental study of micro dimple fabrication based on laser shock processing." Optics & Laser Technology 48 (2013): 216-225. (Year: 2013).*
Yaman, Bilge, and Hasan Mandal. "Wear performance of spark plasma sintered Co/WC and cBN/Co/WC composites." International Journal of Refractory Metals and Hard Materials 42 (2014): 9-16. (Year: 2014).*
International Search Report and Written Opinion for International Application No. PCT/IB2018/053772 dated Sep. 20, 2018.
Peng et al., "Influence of Laser Shock Processing on WC-Co Hardmetal," Mater Manufact Procs 31(6):794-801 (2015).
Wang et al., "Laser shock processing of polycrystalline alumina ceramics," J Amer Cer Soc 100:911-919 (2016).

* cited by examiner

METHOD AND SYSTEM FOR IMPROVING THE SURFACE FRACTURE TOUGHNESS OF BRITTLE MATERIALS, AND A CUTTING TOOL PRODUCED BY SUCH METHOD

RELATED APPLICATIONS

This application is a U.S. National Stage of International Application No. PCT/IB2018/053772, filed May 28, 2018; which claims priority to Netherlands Application No. 2018981, filed May 26, 2017.

BACKGROUND TO THE INVENTION

This invention relates to a method and system for improving the surface fracture toughness of brittle materials, which, in turn, improves other mechanical properties such as abrasion resistance. In particular, but not exclusively, the invention relates to a method of inducing residual compressive stresses in brittle materials, preferably by means of laser shock peening. For example, the invention relates to a method of performing laser shock peening of cemented carbides, such as NbC and WC based cermets, for improved cutting edge fracture toughness. The invention also relates to a cemented carbide cutting element or cutting element insert which is manufactured using the method according to the invention.

Cutting, mining and other industrial abrasive tools are commonly made from hard, brittle materials such as cemented carbides, for example. Cemented carbides are well-known and originally consisted of micron sized tungsten carbide particles bonded with cobalt. An advantage of cemented tungsten carbide is that it is more wear resistant than tool steels whilst having a high toughness. As a result of these properties, cemented tungsten carbide has been used over the years in the manufacture of tools used in industrial applications where wear resistance and toughness are important criteria.

In an attempt to improve the mechanical, cutting properties of such tools, the sintering process, the composition of the material and/or the surface treatment of the material could be improved.

Known attempts at improving the composition of the materials have included the use of cermets. Cermets are composite materials comprising ceramics, such as WC and/or NbC, embedded in a ductile metallic matrix, such as Co, Ni and/or Fe. Tungsten carbide (WC)—cobalt (Co) based cermets are commercially the most successful cermets due to the good combination of hardness, abrasion wear resistance, fracture toughness and strength. However, because of recent WC supply constraints and increasing cost, as well as poor chemical stability, particularly for machining of steels and cast irons, alternatives such as niobium carbide have been investigated. Niobium carbide (NbC) has similar hardness (about 19.6 GPa) to WC (about 22.4 GPa), a high melting point (3522° C.) which is good for high temperature applications, and low density (7.89 g/cm$^3$). Niobium carbide has improved high temperature properties compared to WC, such as retention of hot hardness at elevated temperatures and good chemical stability, particularly when machining steels and cast irons. However, NbC—Co cermets produced by conventional liquid phase sintering (LPS) have lower hardness and fracture toughness than WC—Co cermets, because of NbC grain growth. The poor fracture toughness ($K_{IC}$) leads to mechanical failure, particularly spalling, at the NbC based tool inserts cutting edge as shown in FIG. 1. The failure is typically due to the mechanical and thermal cyclic loading during face milling. FIG. 1 shows an optical image of a NbC-12Co (wt %) cutting tool insert in which the catastrophic failure of the cutting edge on (a) the flank and (b) the rake due to mechanical failure during face-milling of BS 1452 grey cast iron can be seen.

Although cemented carbides in use today are still predominantly tungsten carbide cemented with cobalt, many variations have been introduced. For example, titanium carbide and tantalum carbide by themselves or mixed with tungsten carbide have been used. In some instances chromium and molybdenum carbide is also added to the carbide mixtures. Other cementing alloys, such as alloys of nickel and iron, have also been proposed. It has also been suggested to apply coatings to cemented carbides in an attempt to improve their cutting properties. One disadvantage of tungsten carbide cemented with cobalt is that it requires a hard film coating to prevent the chemical interaction when machining steel and cast iron. It is for this reason that niobium carbide is investigated as a possible replacement of tungsten carbide as it does not require such a coating. However, prior attempts to use niobium carbide have failed due to the spalling problems during abrasive cutting.

Laser shock peening (LSP) is a well-known cold working process in which the surface of a material is treated with laser pulses to impart beneficial compressive residual stresses in the material so as to increase the resistance of the material to surface-related failures. The LSP process is one of the most advanced forms of peening, with several advantages over conventional mechanical peening processes. The depth and magnitude of compressive residual stresses generated with LSP is greater than mechanical peening. The LSP process uses high powered laser pulses which are forced onto the target to generate a rapid plasma expansion. An inertial confinement medium is used to confine and enhance the pressure of the plasma to achieve high pressure of several GPa. The high pressure acting over a short time interval drives a shock wave through the solid target with sufficient strength to exceed the material's dynamic yield strength, thereby generating beneficial compressive residual stresses.

These compressive stresses, which inhibit crack propagation under static and cyclic loading, thus improve the fracture toughness ($K_{IC}$) and fatigue life.

However, like mechanical shot peening, LSP is typically applied to metals since the generation of the residual stress is achieved by introduction of plasticity through the material's surface. Although there have been attempts to perform LSP on brittle materials, such as ceramics, they have been largely unsuccessful in improving the fracture toughness. It has been believed that the use of peening for ceramics is problematic as brittle materials may not exhibit significant plastic deformation and, accordingly, the development of the residual stresses required for improved fracture toughness ($K_{IC}$) may not be possible. However, conventional, mechanical shot peening has been shown to be feasible for some ceramics, such as SN-N320X and A61, using very specific processing conditions, although variability in the process may potentially introduce damage.

Little research has been carried out on the effect of LSP on these industrial materials, but it has been found that LSP can introduce cracks in the surface and cause catastrophic fracture of the brittle materials, which have a very limited range to achieve deformation and residual stress generation.

JP 2013-107143 describes a process in which LSP is conducted on a tool substrate to decrease the difference in hardness between the tool substrate and the hard film coating applied to the tool, thereby to improve the adhesion strength between the tool substrate and the hard film coating, which is a TiAlN coating. The object of this process was to increase the surface hardness of the tool substrate. However, a person skilled in the art of LSP would know that known methods of LSP affect the microstructure of the material being, which leads to an increase in microhardness. One disadvantage of this known process is that by increasing the microhardness the fracture toughness is sacrificed. The process of JP 2013-107143 neither results in improved fracture toughness of the tool substrate nor mentions the use of fracture toughens as a critical parameter in the LSP process.

Peng et al. ("Influence of Laser Shock Processing on WC—Co Hardmetal", MATERIALS AND MANUFACTURING PROCESSES, section 31, no. 6, 9 Dec. 2015 (2015 Dec. 9), pages 794-801, XP00277716) explores using LSP as an alternative to using coatings, such as TiAlN, as a way of modifying the microstructure and increasing the hardness of the WC—Co tools. Again, the process focusses on changing the microstructure in order to improve the microhardness of the tool substrate. In this document the improved wear resistance is attributed to grain refinement resulting from LSP. The focus of this process is on increasing the surface hardness and neglects the role of fracture toughness completely. Based on common knowledge in the art of LSP such improvement in grain refinement and surface harness will come at the detriment of surface toughness and resistance to defects/flaws (fracture toughness).

Wang et al. ("Laser shock processing of polycrystalline alumina ceramics", JOURNAL OF THE AMERICAN CERAMICS SOCIETY, section 100, 7 Nov. 2016, pages 911-919, XP002777166) also concerns the microstructural changes resulting from LSP and, in particular, investigated the processing-microstructure-property relationship of alumina ceramics. Although they found that compressive residual stresses on the surface induced by LSP can improve the resistance of alumina ceramics to indentation cracking, the fracture toughness of alumina is very low and an abrasive cutting tool manufactured from alumina would simply fracture.

Another method of performing LSP on a brittle material, such as tungsten carbide in a cobalt matrix, is known from DE 10 2007 000486. Again, this method focusses on increasing the surface hardness. As mentioned above, this results in the sacrifice of fracture toughness.

It is an object of this invention to alleviate at least some of the problems experienced with existing methods of improving the cutting edge fracture toughness of brittle materials, and in particular existing methods of performing laser shock peening on cemented carbides.

It is a further object of this invention to provide a method of inducing residual compressive stresses in brittle materials, in particular to provide a method of performing laser shock peening on brittle materials, that will be a useful alternative to existing methods. It is yet a further object of this invention to provide a tool, such as a cutting tool, that will be a useful alternative to existing cutting tools.

SUMMARY OF THE INVENTION

In accordance with a first aspect of the invention there is provided a method of improving the wear resistance of a cemented carbide, the method including:
  using fracture toughness as a selection criterion and selecting a cemented carbide which has a fracture toughness between about 6 and about 15 MPa·m$^{1/2}$;
  applying a sacrificial coating to the cemented carbide; and
  increasing the fracture toughness of the cemented carbide by creating a toughened surface layer using laser shock peening, thereby increasing its fracture resistance to fatigue and stress corrosion cracking.

The method includes residual compressive stresses in a substrate of the cemented carbide without changing its microstructure.

The energy being delivered to the brittle material during the LSP process may be in the range of about 300 mJ to about 600 mJ, preferably in the range of about 410 mJ to about 440 mJ.

The spot size of the laser used in the laser shock peening may be between about 0.7 to about 1.2 mm.

The LSP process may have a pulse duration of between about 7 ns and about 10 ns (FWHM).

The LSP process may have a pulse duration of about 8.6 ns (FWHM).

The LSP process may have a power Intensity of between about 1 and about 20 GW/cm$^2$, preferably about 7.5 and about 8.5 GW/cm$^2$.

The LSP process may have an overlap of between 0 and 90%.

The sacrificial coating is preferably a thermo-protective coating in the form of black PVC tape.

The method may include using an inertia containment medium in the form of a laser transparent medium, such as water.

The method may include producing the brittle material by means of rapid sintering, such as spark plasma sintering (SPS).

The cemented carbide may be selected from the group consisting of WC—X—YCo, YCo, NbC—X—YCo and NbC—X—YNi, where X is either one or a combination of $Cr_3C_2$, $Mo_2C$, TiC, SiC, TaC and VC, and Y is the weight percentage of the binder phase and is in the range about 4 to about 16%, preferably about 8 to about 10%.

In accordance with another aspect of the invention there is provided a method of manufacturing a cutting tool having a cemented carbide cutting insert, including improving the wear resistance of the cemented carbide using the method according to the first aspect of the invention.

In accordance with yet a further aspect of the invention there is provided a cutting tool comprising a core made from a cemented carbide, which has a fracture toughness between 6 and 15 MPa·m$^{1/2}$, and a surface layer toughened by laser shock peening, wherein the processed surface layer has an increased fracture toughness compared to the fracture toughness of the core.

The cemented carbide may be selected from the group consisting of WC—X—YCo, NbC—X—YCo and NbC—X—YNi, where X is either one or a combination of $Cr_3C_2$, $Mo_2C$, TiC, SiC, TaC and VC, and Y is the weight percentage of the binder phase and is in the range about 4 to about 16%, preferably about 8 to about 10%.

In accordance with another aspect of the invention there is provided a system for performing laser shock peening on a cemented carbide, the system including a laser source capable of delivering between about 300 mJ to about 600 mJ to the cemented carbide at a pulse duration of between about 7 ns and about 10 ns (FWHM) and a power intensity of between about 1 and about 20 GW/cm$^2$, a sacrificial coating for application to the cemented carbide during laser shock peening and inertia containment medium in the form of a laser transparent medium.

The sacrificial coating is preferably a sacrificial thermo-protective coating in the form of black PVC tape.

The spot size of the laser produced by the laser source may be between about 0.7 to about 1.2 mm.

The laser source may be capable of delivering between about 410 mJ to about 440 mJ to the cemented carbide.

The power intensity may be between about 7.5 and about 8.5 $GW/cm^2$.

The pulse duration may be about 8.6 ns.

BRIEF DESCRIPTION OF THE DRAWINGS

The invention will now be described in more detail, by way of example only, with reference to the accompanying drawings in which.

DETAILED DESCRIPTION OF THE INVENTION

Figure 1:
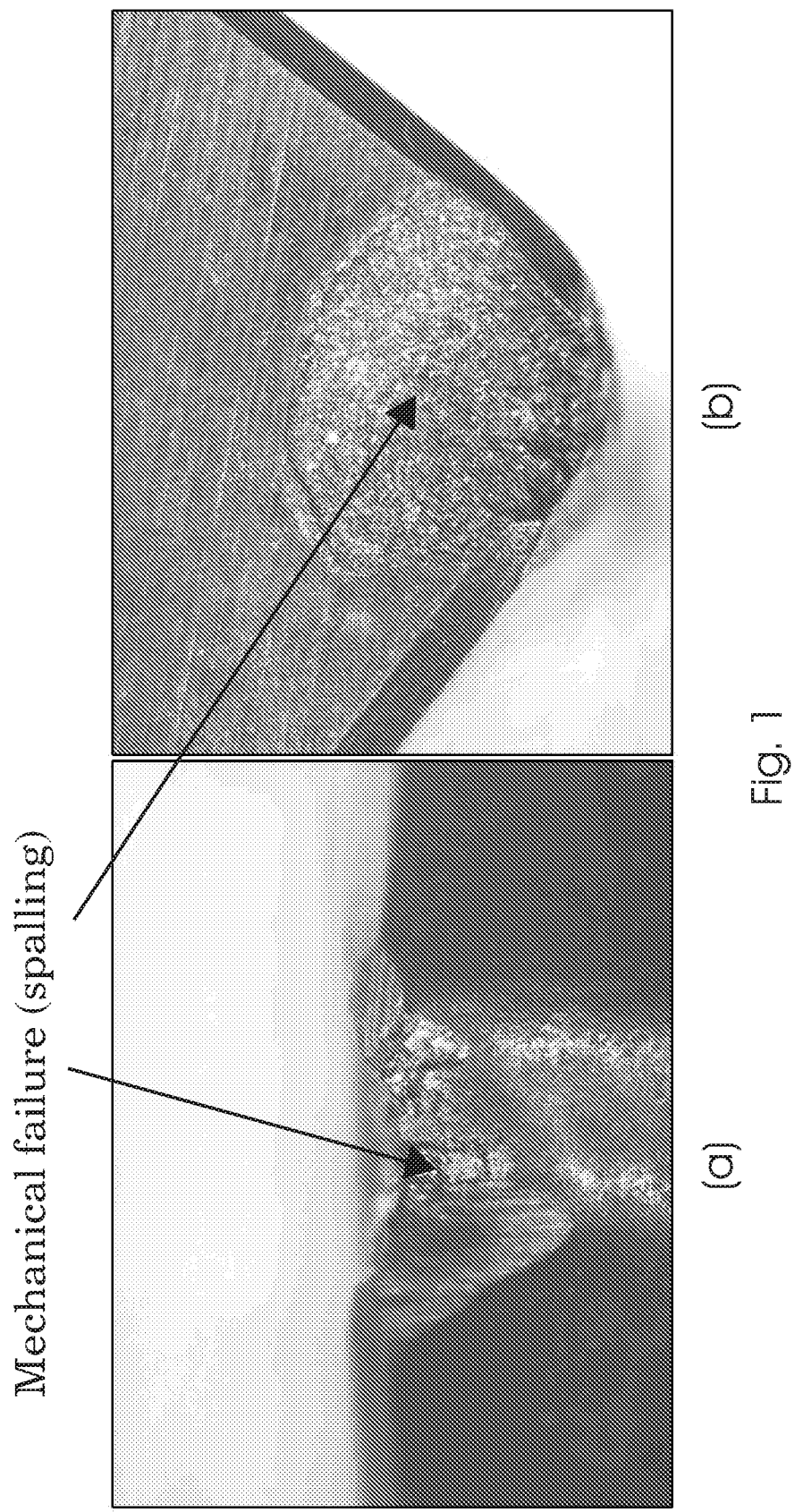
FIG. 1 shows an optical image of an NbC-12Co (wt %) cutting tool insert showing catastrophic failure of the cutting edge on (a) the flank and (b) the rake due to mechanical failure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

A non-limiting example of a method of improving the wear resistance of brittle materials will now be described. In the context of this description the term "brittle materials" describe materials that have a combination of Shetty's fracture toughness of between 6 and 15 $MPa \cdot m^{1/2}$ and a Vickers microhardness of between 9 and 17 GPa. The method preferably includes introducing compressive stresses in the brittle material, such as ceramics, cemented carbides or cermets, by performing laser shock peening (LSP). In the exemplified method discussed in detail below, various cermets are used. These cermets are typically selected from the group consisting of WC—X—YCo, NbC—X—YCo and NbC—X—YNi, where X is either one or a combination of $Cr_3C_2$, $Mo_2C$, TiC, SiC, TaC and VC, and Y is the weight percentage of the binder phase and is in the range about 4 to about 16%, preferably about 8 to 10%. In the method described under the discussion of the experimental results the cermets include WC-0.8$Cr_3C_2$-12Co, NbC-12Co and NbC-12Ni. It should however be understood that the method is not limited to these cermets and could be used on other brittle materials. It is further envisaged that the cemented carbides or cermets described in this specification could find particular application in the manufacturing of cutting tools, mining tools and tools used in other industrial applications where wear resistance and fracture toughness are important criteria. In this specification the word tool should be interpreted to include an insert for the tool where the insert defines the cutting edge.

As mentioned above, the NbC—Co cermets produced by conventional liquid phase sintering (LPS) have a lower hardness and fracture toughness than WC—Co cermets, because of NbC grain growth. In order to reduce the grain size of the NbC a rapid sintering technique, such as spark plasma sintering (SPS), is used. It has been found that due to the reduction in grain size resulting from the SPS there is an improvement in the hardness and wear resistance. However, a negligible change in $K_{IC}$ is achieved by the SPS process. Prior to conducing any surface treatments, such as laser shock peening, one way of improving the $K_{IC}$ is by alteration of the composition of the cermet. For example, the composition can be altered by complete or partial substation of Co binder with Ni. Nickel has a higher plasticity than Co and always retains the more ductile $f_{cc}$ structure (it has no phase transformation like Co), which increases the $K_{IC}$, but reduces hardness.

In the SPS process, powder compositions are consolidated in a spark plasma sintering furnace. The powders are poured into cylindrical graphite dies with inner and outer diameters of about 20.9 mm and about 40 mm respectively, and about 48 mm height. The composite powder assemblies are heated in a vacuum (typically about 2 Pa) in two steps with different sintering profiles, depending on the powder compositions, to achieve good densification. For example, WC-10Co (wt %) powders are first heated to 1000° C. at a heating rate of 200° C./min and subsequently to 1220° C. at a heating rate of 100° C./min, and the temperature is held at 1220° C. for 5 minutes during sintering. A cooling rate of 200° C./min is applied to all cermets. The applied pressure is adjusted from 16 MPa to 30 MPa at 1000° C., and from 30 MPa to 50 MPa at 1220° C. within 30 seconds. The pressure is then held constant at 50 MPa throughout the rapid sintering cycle. Horizontal and vertical graphite papers are used to separate the powders from the die and punch set-up. Hexagonal boron nitride is placed on the graphite paper to prevent carbon diffusion from the graphite paper to the powders during sintering.

Next, the cermet's resistance to crack-based phenomena such as fatigue and stress corrosion cracking is improved by means of a surface treatment. In the preferred method the surface treatment is in the form of laser shock peening (LSP). After sintering, the cermet is polished using standard metallographic procedures and LSP is performed on the cermet's polished surface.

An optimised combination of LSP parameters of laser power intensity, spot size and spot coverage is applied to the cermet using a thin water layer as the inertial confinement medium. The inventors have identified that the following optimised laser shock peening process conditions result in compressive stresses being introduced in the surface of the cermet:

1. Energy: between about 20 mJ to about 100 000 mJ, preferably between about 300 mJ and about 600 mJ, most preferably between about 410 mJ to about 440 mJ;
2. Spot size: between about 0.7 to about 1.2 mm;
3. Pulse duration: about 0.5 ns to about 50 ns (FWHM), preferably between about 7 and about 10 ns, more preferably about 8.6 ns;
4. Power Intensity: about 1 to about 20 $GW/cm^2$, preferably about 7.5 to about 8.5 $GW/cm^2$; and
5. Overlay: from 0% to 90% overlap.

During the LSP process, a sacrificial thermo-protective overlay or coating is applied to the cermet. It has been found that PVC tape, preferably black, is particularly effective as a sacrificial coating. A laser transparent medium, such as water for example, could also be used as an inertia containment medium during the LSP process.

In the above method, LSP is performed on the cutting tool or insert prior to applying any surface coating, such as a hard film coating. It is envisaged that an uncoated cutting tool or insert could be peened using LSP to improve mechanical fracture properties and thereafter coated with an external coating to improve other properties, such as chemical stability and high temperature resistance. The method of improving wear resistance in accordance with the invention is therefore applied to a coating-free cutting tool or insert.

Experimental Results

Experimental testing was carried out on cermets produced by the above process in order to compare their mechanical properties to cermets produced by conventional methods. Cermets with the lowest $K_{IC}$ were used as control samples during optimisation of the LSP parameters to ensure that the induced compressive residual stress would not result in crack formation. The optimised combination of parameters was then applied to all the cermets.

The conventional cermets used in the experimental testing were produced by liquid phase sintering. In particular, the liquid phase sintering was performed by heating the powders in a vacuum (0.04 MPa) at an initial heating rate of 2.4° C./min up to 1200° C. At 1200° C., cobalt loss protection (CLP) was carried out by adding argon gas at a pressure of 0.37 MPa, and a heating rate 3.5° C./min up to 1430° C. The temperature was held constant for 75 minutes, and for the last 20 minutes, hot isostatic pressing (HIP) was done at 4.4 MPa to eliminate all the surface porosity. The furnace was then water cooled at a rate of 3.5° C./min.

The different sintered samples used in the experimental tests are shown in Table 1 below.

TABLE 1

Samples and sintering processes

| Samples (wt %) | Sintering process |
|---|---|
| WC—0.8$Cr_3C_2$—12Co | Liquid phase sintering |
| WC—0.8$Cr_3C_2$—12Co | Spark plasma sintering |
| NbC—12Co | Liquid phase sintering |
| NbC—12Co | Spark plasma sintering |
| NbC—12Ni | Liquid phase sintering |
| NbC—12Ni | Spark plasma sintering |
| F1 | Liquid phase sintering |
| F1 | Spark plasma sintering |
| C1 | Liquid phase sintering |

F1 and C1 are NbC based cermets with proprietary carbide additives to improve their abrasive resistance properties.

Archimedes' principle was used to determine the density of the sintered cermets. Microstructures of the cemented carbides were examined in a field emission scanning electron microscope, with energy dispersive X-ray spectroscopy. Vickers microhardnesses ($HV_{30}$) were measured on polished specimens before and after LSP, using a load of 30 N, calculating an average from five indentations on different regions of each cermet. The following criteria for the accurate derivation of fracture toughness ($K_{IC}$) using Shetty's equation were satisfied:

$c/a > 1.3$ and $0.25 \leq l/a \leq 2.5$, where c is the crack length from the centre of indentation to the crack tip, a is half diagonal length of indentation and l is the difference between c and a.

Shetty's facture toughness was calculated using Equations (1) and (2):

$$K_{IC} = 0.0889 H^{1/2} \times (P/4l)^{1/2} \quad (1)$$

where H=Vickers hardness (GPa)
P=Applied force (Newton)
l=Average crack length (mm)

$$l = (2c - 2a)/2 \quad (2)$$

Figure 2:
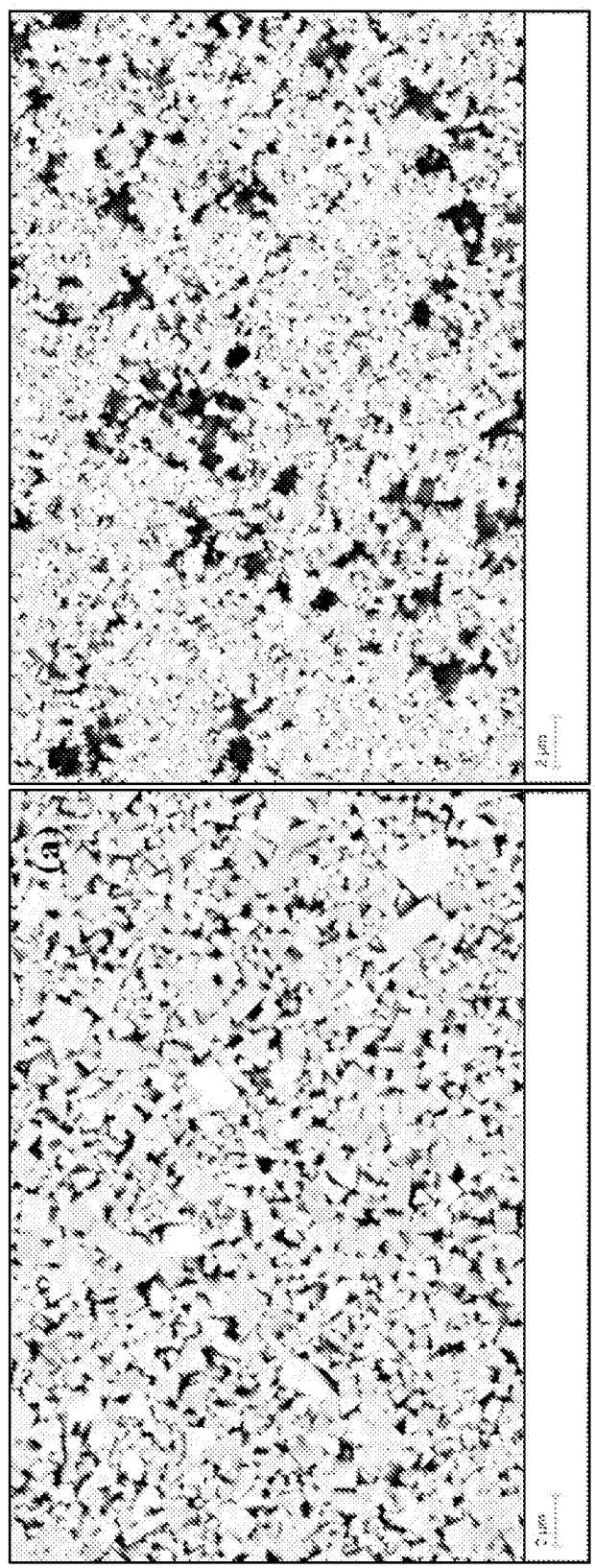
FIG. 2 shows SEM-BSE images of WC-12Co (wt %), showing WC (light), and Co (dark), sintered by (a) LPS and (b) SPS.

FIGS. 2(a) and (b) show SEM micrographs of WC-10Co (wt %), sintered by conventional LPS and SPS respectively. The LPS cermet (FIG. 2(a)) had larger WC grains with smaller and more homogeneously distributed Co pools than the SPS cermet (FIG. 2(b)). The finer WC grains in the SPS cermet were from the shorter sintering dwell time and lower sintering temperatures, which prevented continuous Ostwald ripening. The more homogenous Co binder distribution in the LPS cermet was due to the formation of the Co-liquid phase during sintering, which enhanced WC solubility, as well as the capillarity action of the liquid phase between the pores during the secondary rearrangement stage of sintering.

Figure 3:
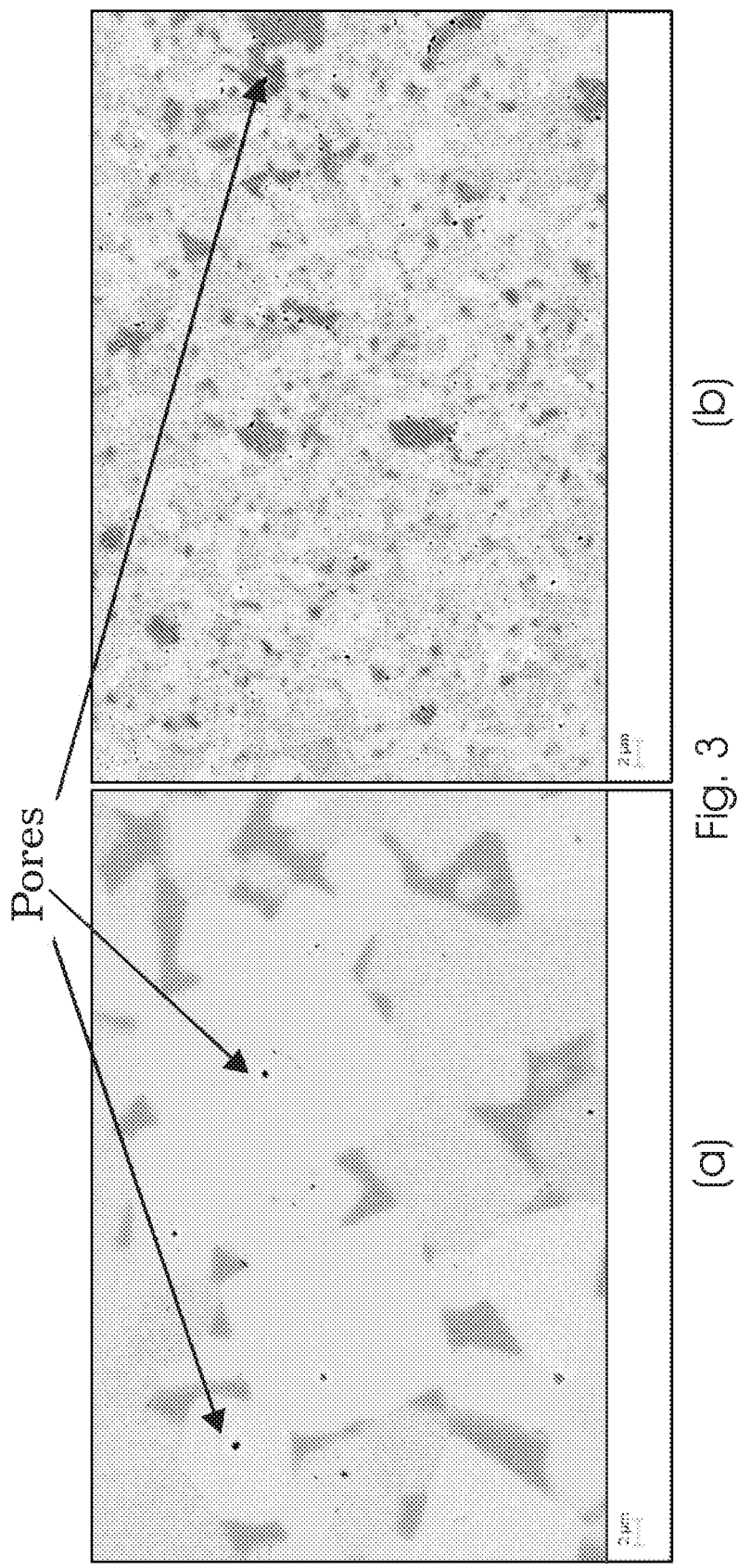
FIG. 3 shows SEM-BSE images of NbC-12Ni (wt %), showing NbC (light), Ni (medium) and pores (dark), sintered by: (a) LPS and (b) SPS.

During SPS, there is considerable variation in temperature from the centre to the surface of the conducting particles (Co and Ni) when the pulse electric current is passed. The temperature at the contacting surface reaches very high values, up to several thousand degrees, and momentarily results in melting, followed by rapid solidification of the metal binder. The rapid solidification prevents the homogenous distribution of the binder phase, explaining the poor binder distribution in the SPS cermet. Similarly, FIG. 3 shows that the LPS NbC-12Ni (wt %) (FIG. 3(a)) cermet had larger NbC grains than for the similar composition produced by SPS. This trend was observed in all the cermets produced by both LPS and SPS. A few pores were observed in the microstructures of the NbC based compositions and were attributed to the oxygen impurities in the starting NbC powders (1.6 wt %) which created spherical pores during sintering, explaining the slightly lower densification of the NbC based cermets compared to the WC cermets (see Table 2 below).

Figure 4:
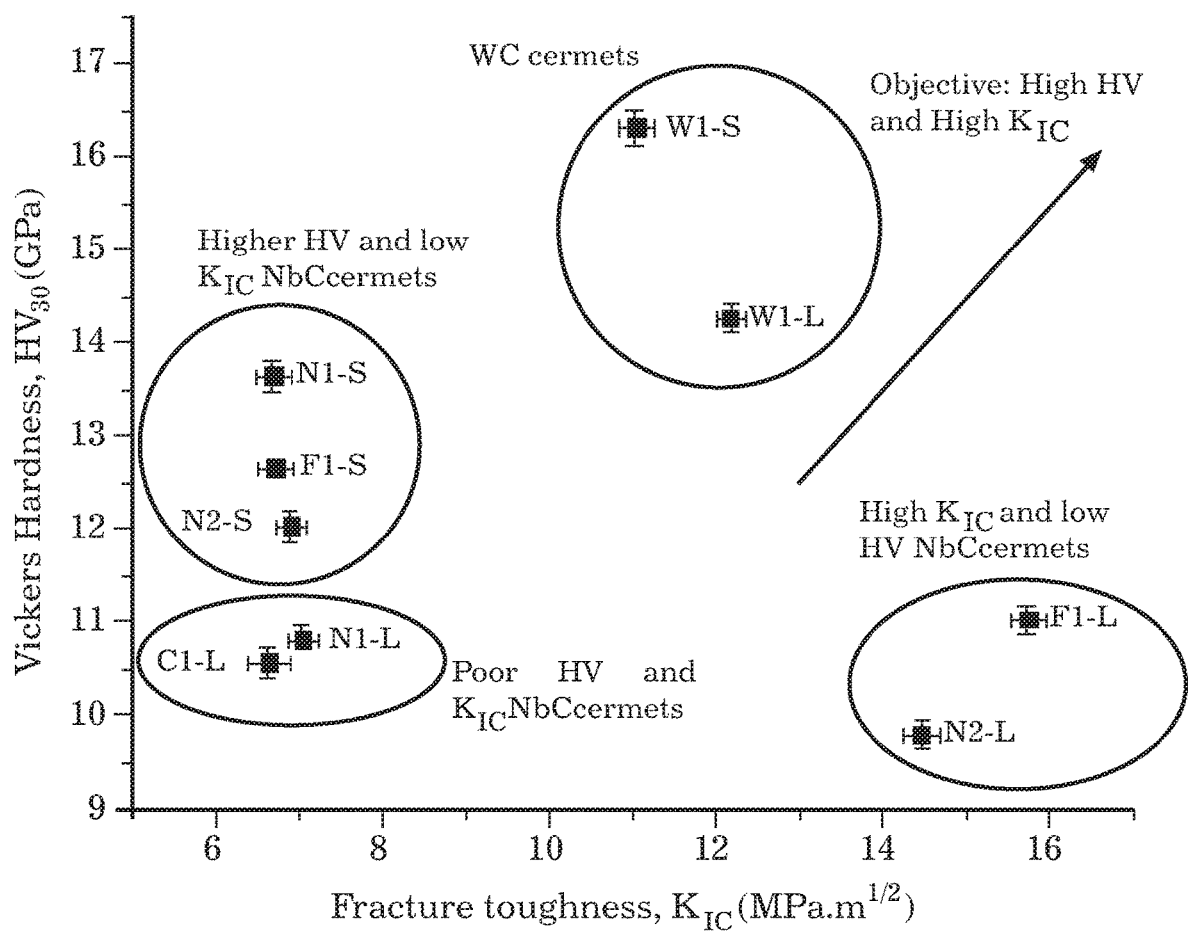
FIG. 4 illustrates the relationship between Vickers microhardness ($HV_{30}$) and fracture toughness ($K_{IC}$)

From Table 2 below and FIG. 4 it can be seen that all the SPS cermets had a higher microhardness than the similar composition samples produced by LPS. This is due to the finer WC and NbC grains, from the short sintering times and lower sintering temperatures. Both LPS and SPS WC-12Co (wt %) cermets had a higher microhardness than all the NbC based cermets, irrespective of the sintering technique, due to the higher microhardness of WC (22.4 GPa) compared to NbC (19.6 GPa). Substitution of Co with Ni in the NbC cermets reduced the hardness, because of nickel's lower hardness and higher plasticity than cobalt. All the LPS cermets had generally higher $K_{IC}$ than their SPS counterparts (Table 2 and FIG. 4), because of better binder distribution from the secondary rearrangement of grains during sintering.

Figure 5:
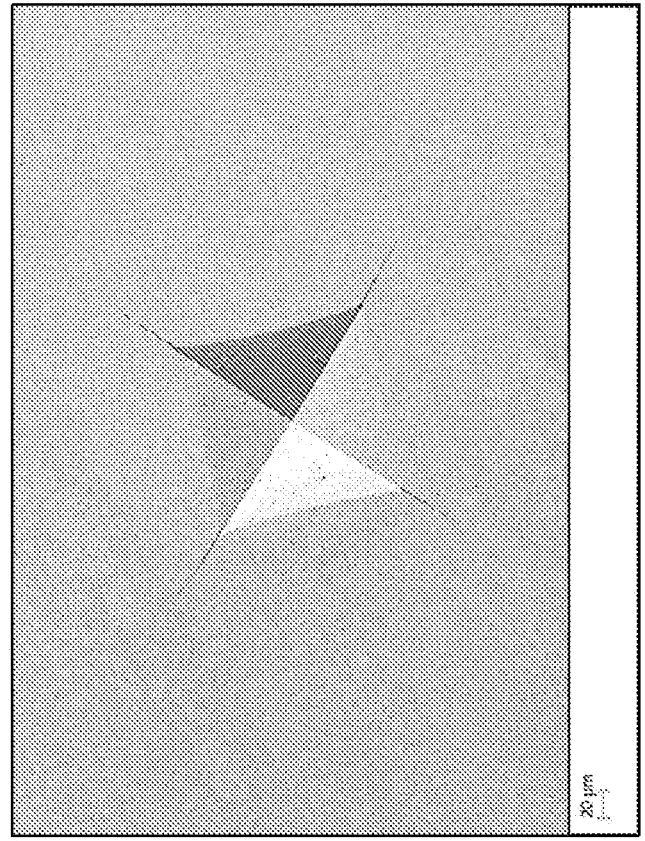
FIG. 5 shows SEM-SE images of WC—$Cr_3C_2$-12Co (W1-L) produced by LPS, showing: (a) long radial cracks before LSP, and (b) shorter radial cracks after LSP.
Figure 5:
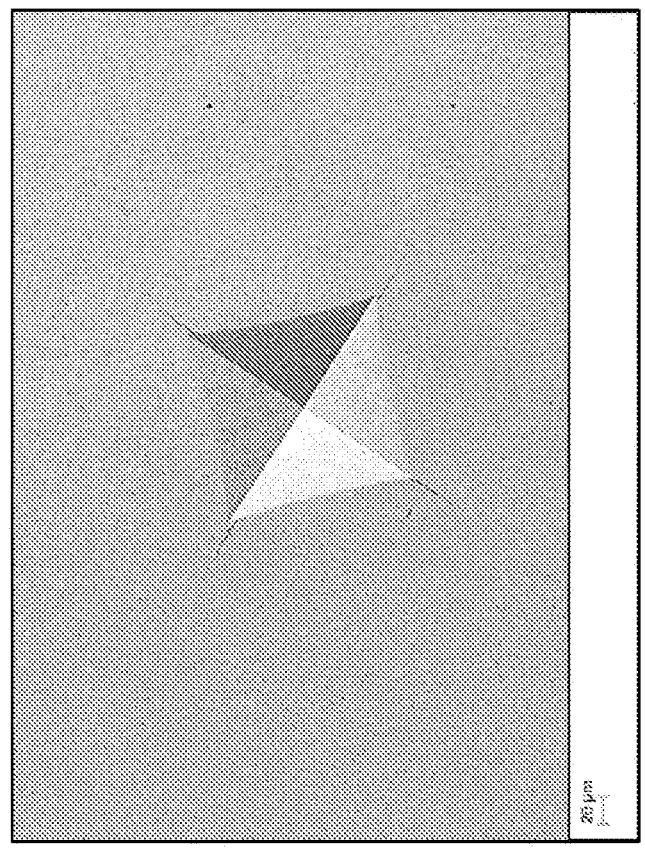
Figure 6:
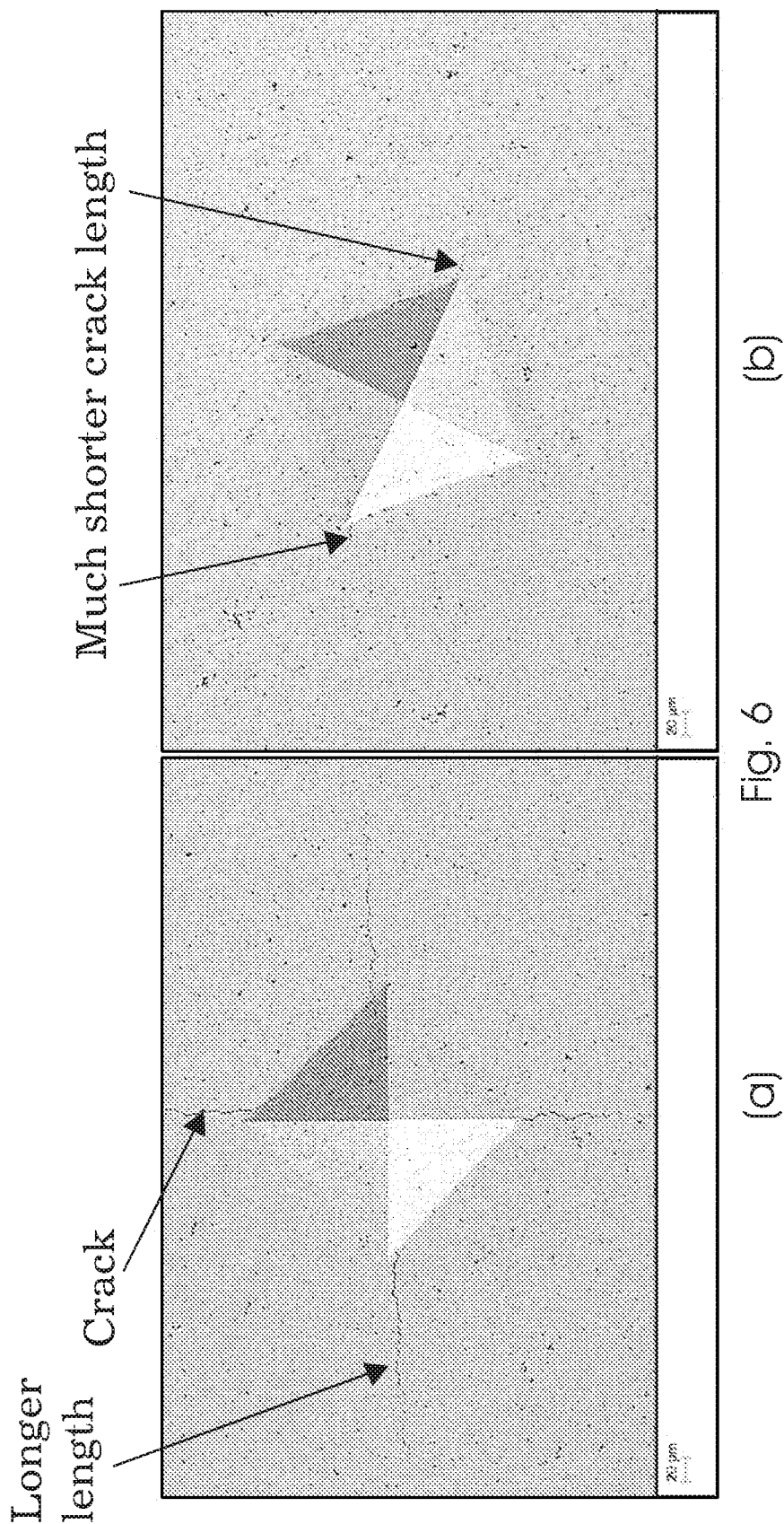
FIG. 6 shows SEM-SE images of NbC based C1-L cermets produced by LPS, showing: (a) long radial cracks before LSP, and (b) much shorter radial cracks after LSP.

($\sim$7 MPa·m$^{1/2}$), such as C1-L (FIG. 4), had greater reduction in crack length than liquid phase sintered cermets with higher $K_{IC}$ values, such as W1-L (FIGS. 5 and 6).

Figure 8:
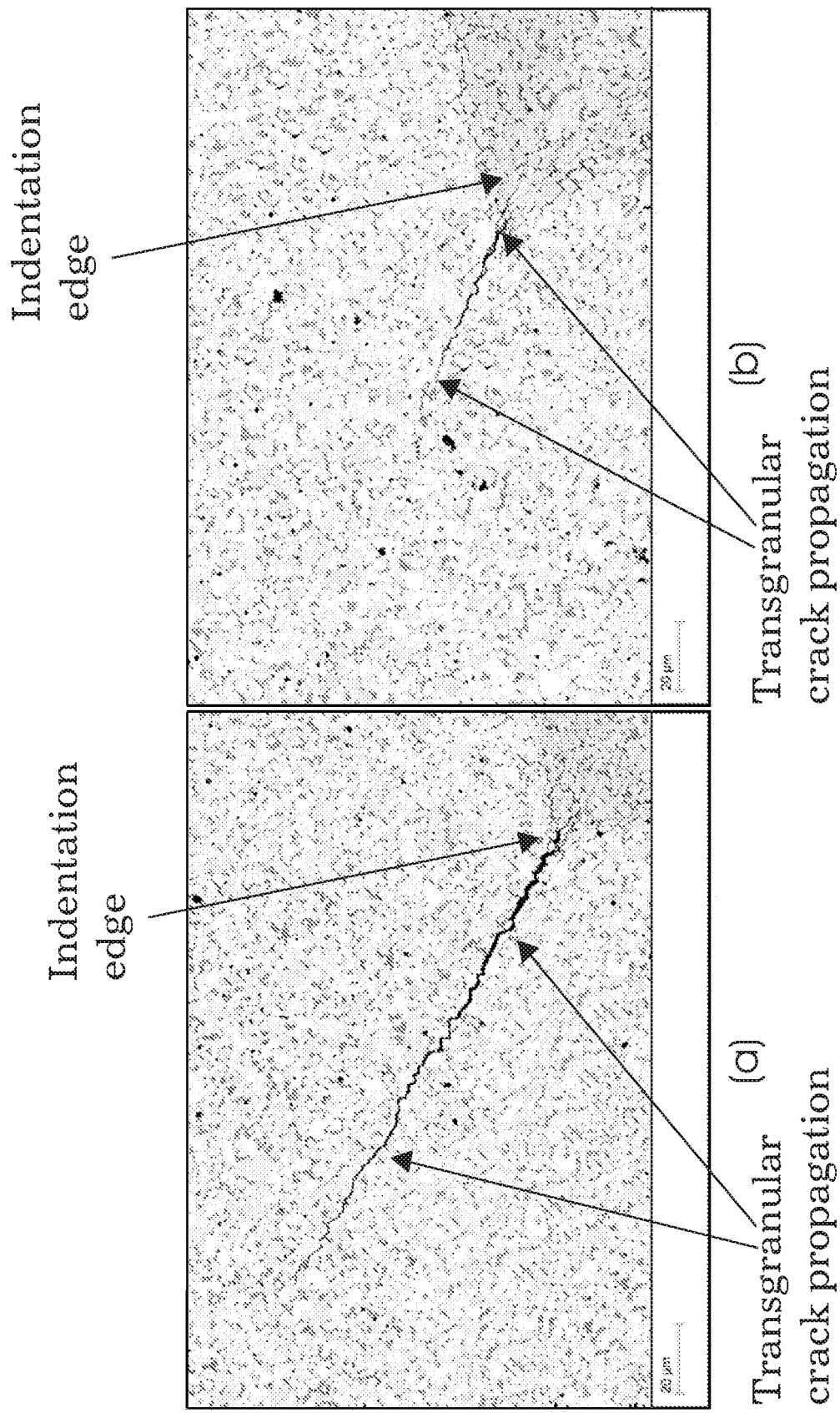
FIG. 8 shows SEM-BSE images of NbC based C1-L cermets produced by LPS, showing crack propagation: (a) before LSP, and (b) after LSP.

No change in crack propagation mode was observed before and after LSP. Transgranular crack propagation, which is the most critical fracture mode in cermets, was the main mode of fracture in all the cermets. Reduction in crack lengths after LSP without change in the crack propagation mode (FIG. 8) was attributed to the induced compressive residual stresses (CRS) which limited transgranular crack propagation.

Further, no change in the microstructure of the cermets was observed after the LSP process. The grain size distribution and the distribution of the binder phase were not significantly altered by the applied LSP process.

Figure 9:
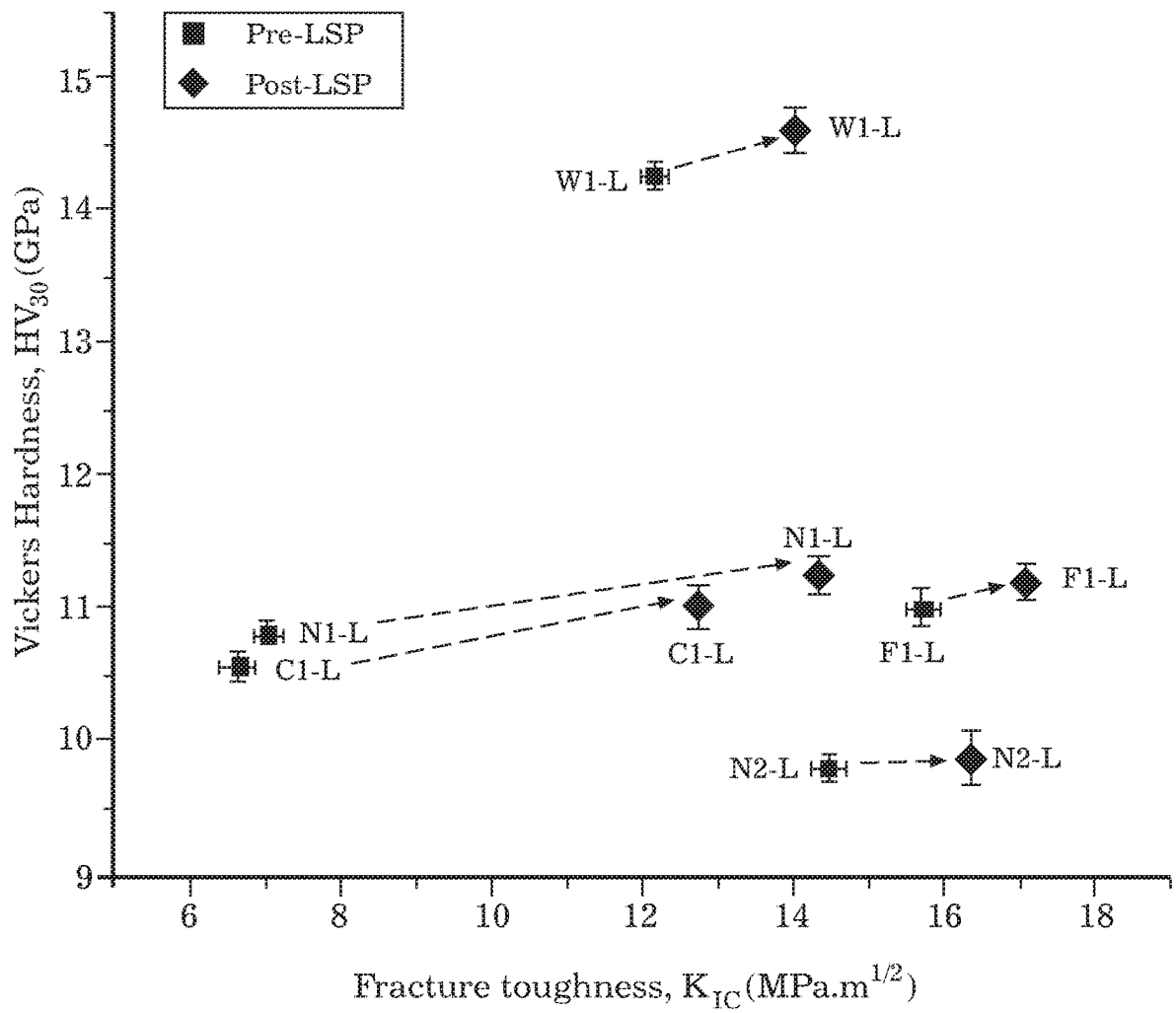
FIG. 9 illustrates the relationship between Vickers microhardness ($HV_{30}$) and fracture toughness ($K_{IC}$) for LPS cermets, before and after LSP.
Figure 10:
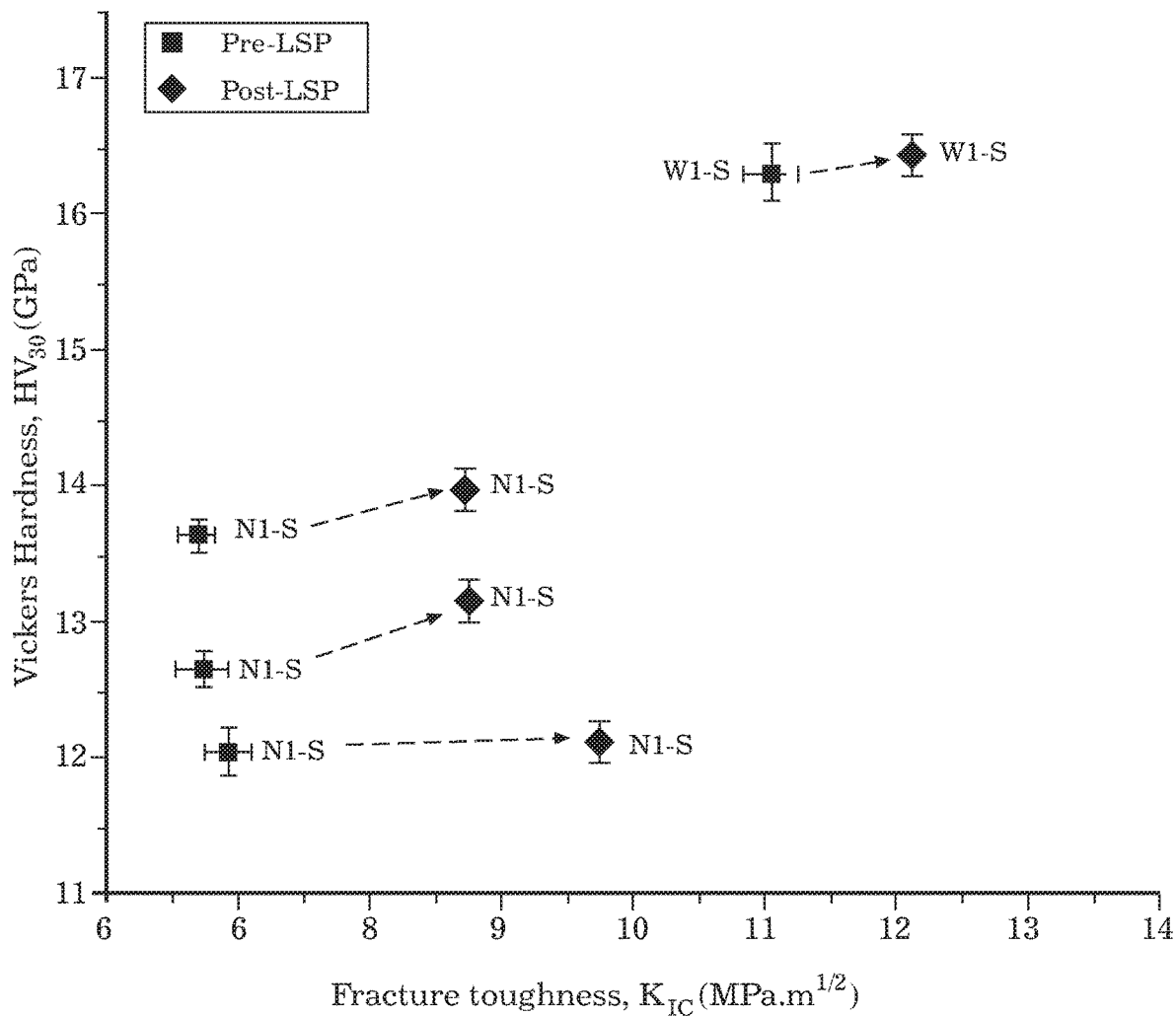
FIG. 10 illustrates the relationship between Vickers microhardness ($HV_{30}$) and fracture toughness ($K_{IC}$) for spark plasma sintered cermets, before and after LSP.

Based on the experimental results it has been found that LSP improved the $K_{IC}$ of all the cermets, and maintained the microhardness as shown in FIGS. 9 and 10. From FIG. 11 it can be seen that the liquid phase sintered cermets with pre-LSP low $K_{IC}$ showed much higher increases in $K_{IC}$ (doubled) than the LPS cermets with pre-LSP high $K_{IC}$ ($\sim$10%). The significant increase in $K_{IC}$ is attributable to two possible reasons. Firstly, since samples with the lowest $K_{IC}$ were used to deduce the optimisation parameters, cermets with pre-LSP higher $K_{IC}$ might achieve higher $K_{IC}$ under more aggressive LSP conditions. Although the samples with

TABLE 2

Densification and mechanical properties of all the samples

| Samples (wt %) | Abbreviation* | Densification (%) | Vickers microhardness, $HV_{30}$ (GPa) | Fracture toughness, $K_{IC}$ (MPa · m$^{1/2}$) |
| --- | --- | --- | --- | --- |
| WC—0.8Cr$_3$C$_2$—12Co | W1-L | 99.67 ± 0.03 | 14.06 ± 0.12 | 12.31 ± 0.19 |
| WC—0.8Cr$_3$C$_2$—12Co | W1-S | 99.50 ± 0.00 | 16.36 ± 0.33 | 11.62 ± 0.16 |
| NbC—12Co | N1-L | 98.40 ± 0.10 | 11.04 ± 0.12 | 7.06 ± 0.19 |
| NbC—12Co | N1-S | 98.27 ± 0.15 | 13.80 ± 0.12 | 6.68 ± 0.11 |
| NbC—12Ni | N2-L | 98.57 ± 0.21 | 9.64 ± 0.16 | 14.42 ± 0.14 |
| NbC—12Ni | N2-S | 98.70 ± 0.17 | 12.04 ± 0.12 | 6.91 ± 0.13 |
| F1 | F1-L | 98.87 ± 0.06 | 11.10 ± 0.18 | 15.75 ± 0.18 |
| F1 | F1-S | 98.91 ± 0.18 | 13.10 ± 0.17 | 6.72 ± 0.16 |
| C1 | C1-L | 98.67 ± 0.15 | 10.72 ± 0.13 | 6.65 ± 0.16 |

*S = spark plasma sintered and L = liquid phase sintered

Both SPS and LPS NbC-12Co (wt %) cermets had much lower $K_{IC}$ than the WC-12Co (wt %) cermets, although they had the same Co binder contents. The reduction in $K_{IC}$ was due to the poorer wetting of Co on NbC than on WC, and the lower solubility in Co of NbC than WC, leading to the formation of brittle interconnected NbC networks and poorer distribution of Co. Substitution of Co with Ni in the NbC based cermets significantly improved the $K_{IC}$, due to the higher plasticity of Ni and its stable $f_{cc}$ structure. The C1-L cermet had the poorest combination of hardness and $K_{IC}$ because of the large NbC grains from LPS.

Figure 7:
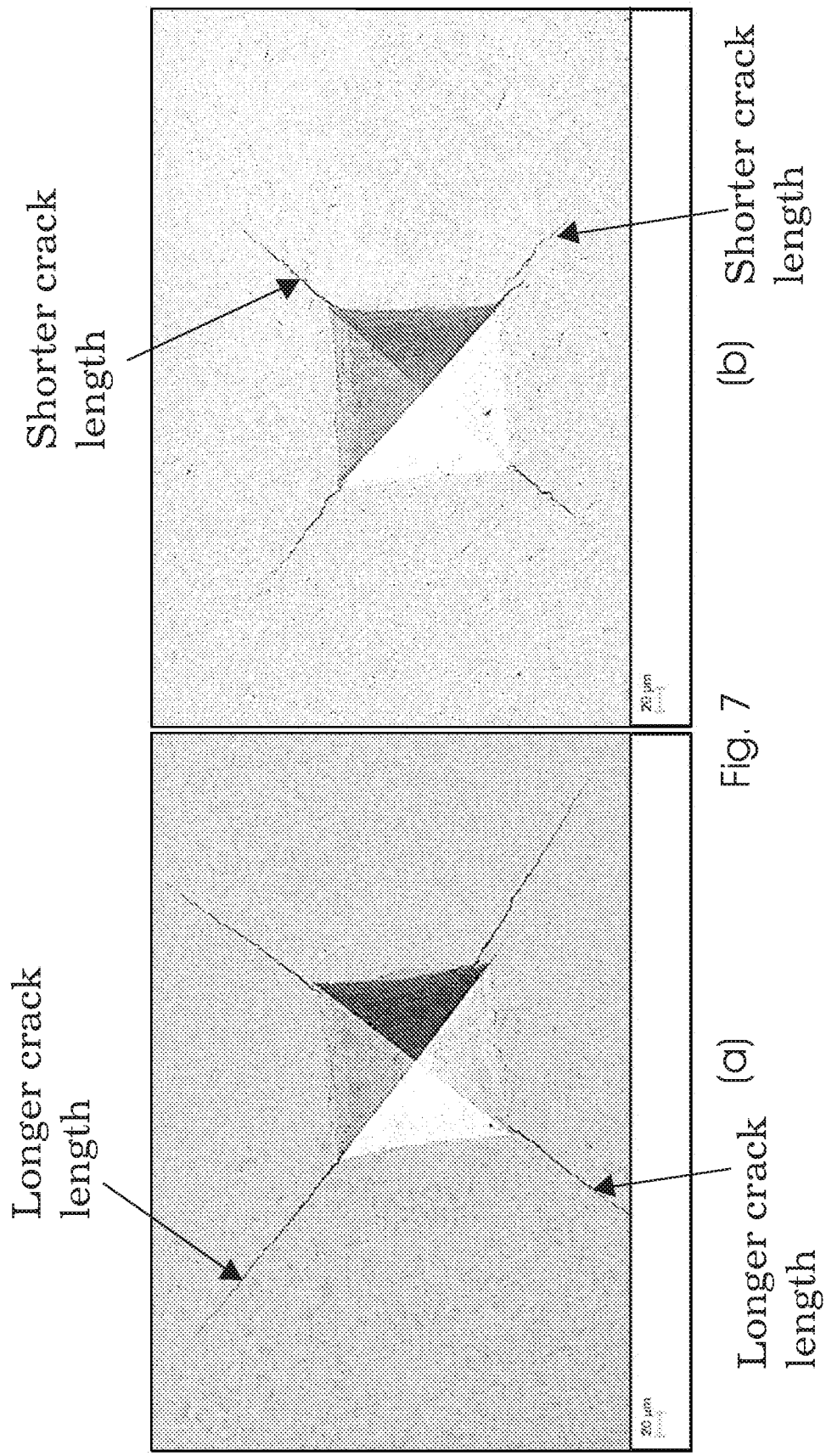
FIG. 7 shows SEM-SE images of NbC based F1-S cermets produced by SPS, showing: (a) long radial cracks before LSP, and (b) shorter radial cracks after LSP.
Figure 11:
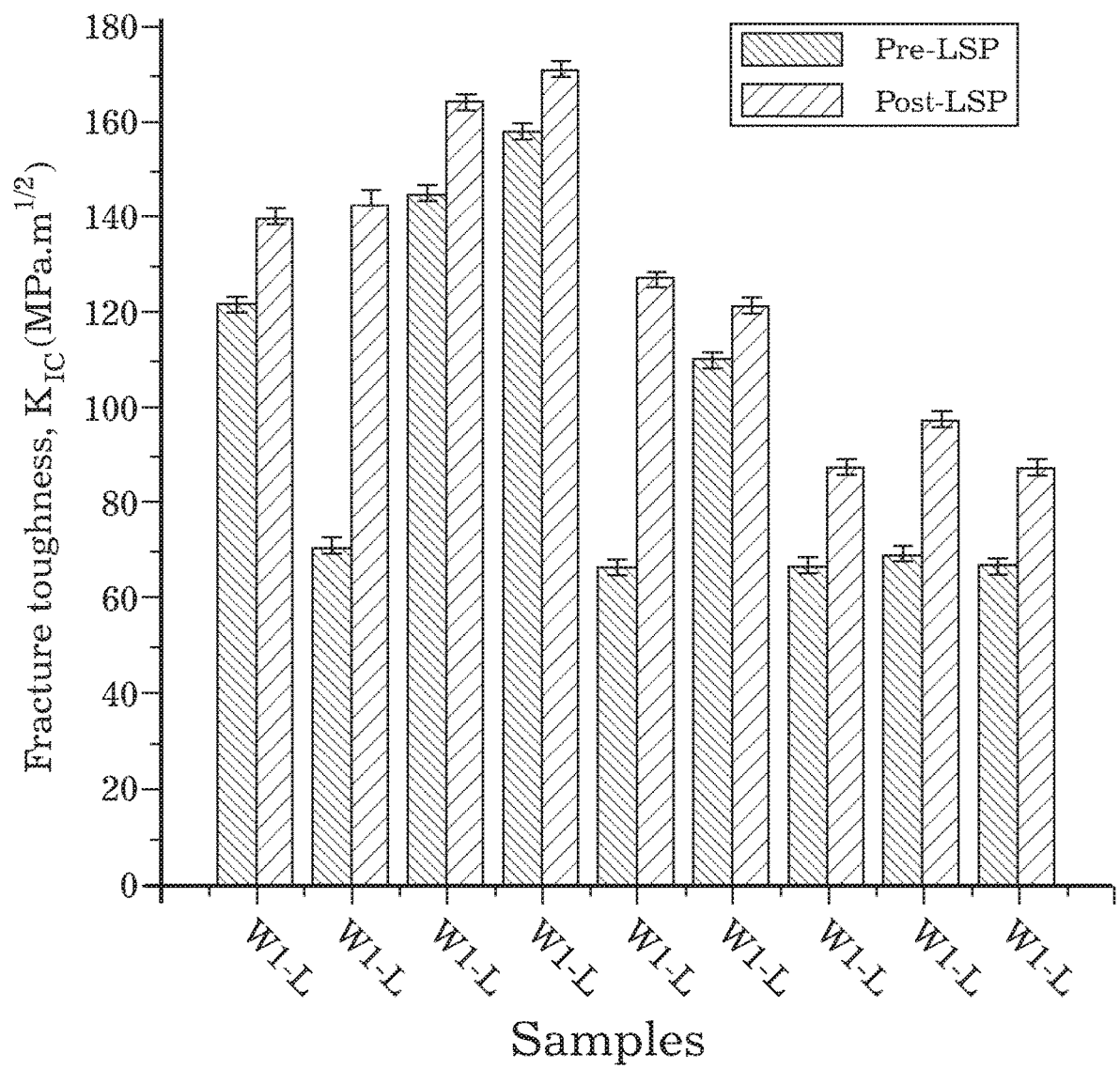
FIG. 11 illustrates the comparison of fracture toughness ($K_{IC}$) of all the cermets used during testing, before and after LSP.

Next, the effect of laser shock peening (LSP) on the cermets was explored. FIGS. 5 to 7 show the Vickers microhardness (HV$_{30}$) indentations and crack lengths in the W1-L, C1-L and F1-S cermets before and after LSP. The indentation crack lengths were used to calculate the Shetty's fracture toughness, where longer crack lengths mean lower fracture toughnesses. All the cermets, irrespective of the sintering technique, had shorter crack lengths after laser shock peening (LSP) than before. Generally, the liquid phase sintered cermets had greater reduction in crack lengths than the cermets produced by SPS (FIGS. 5 to 7). However, the liquid phase sintered cermets with originally low $K_{IC}$ values the lowest pre-LSP $K_{IC}$ that had surface cracks under more aggressive LSP conditions, the samples with higher pre-LSP $K_{IC}$ might not form cracks under the same conditions due to higher toughness, leading to higher induced compressive residual stress and increased $K_{IC}$. Secondly, it is possible that a maximum $K_{IC}$ (threshold) exists for a particular cermet composition, since very short cracks (no cracks in some cases) were observed at the indentation edges of cermets with pre-LSP high $K_{IC}$ values (N2-L and F1-L) after LSP, indicating maximum Shetty's $K_{IC}$. Generally, the liquid phase sintered cermets had a higher $K_{IC}$ than similar composition samples produced by spark plasma sintering (FIG. 11) because of the higher hardness of the spark plasma sintered cermets. For example, the N1-S cermet was ~3 GPa harder than N1-L (Table 2 and FIG. 4) after LSP, and had ~20% increased $K_{IC}$ compared to N1-L which had doubled $K_{IC}$ (FIG. 11). The higher hardness in the SPS cermets may have limited the amount of plastic deformation during LSP, thereby reducing the toughening effect of the induced compressive residual stress.

In cermets, there is an inverse relationship between hardness and $K_{IC}$, so increased hardness generally results in reduced $K_{IC}$. However, by following the process according to the invention, in particular the combinations of rapid sintering (SPS), composition differences (substitution of WC by NbC and Co by Ni) and surface treatment (LSP), it is possible to maintain the hardness and increase the $K_{IC}$ in the same cermet.

From the above description of the experimental results it should be understood that spark plasma sintering (SPS) resulted in higher hardness than conversional liquid phase sintering (LPS) for the same cermet composition. Both LPS and SPS WC-12Co (wt %) cermets had higher hardnesses than all the NbC based cermets, due to the higher hardness of WC than NbC, higher solubility of WC in Co than NbC in Co, as well as NbC in Ni. Substitution of Co by Ni in the NbC cermets increased the $K_{IC}$ due to the higher plasticity of Ni than Co and the former's stable $f_{cc}$ structure. Advantageously, Laser shock peening (LSP) increased all $K_{IC}$ values, irrespective of composition and sintering method. In liquid phase sintered cermets with low $K_{IC}$ (about 6 to 7 MPa·m$^{1/2}$) and low microhardness (about 9 to 10 GPa), an increase of about 100% in $K_{IC}$ was observed. The laser shock peened SPS cermets had an increase of about 20 to 30% in $K_{IC}$ due to their high hardness limiting plastic deformation during LSP, while cermets with initial high $K_{IC}$ values (about 14 to 15 MPa·m½) had the least increase in $K_{IC}$ of about 10%.

From the above description of the method of increasing the fracture toughness of brittle materials, it should be clear that spark plasma sintering (SPS) results in the refinement of the microstructure, thereby increasing the hardness compared to similar materials produced by conventional liquid phase sintering (LPS). It has also been found that substitution of WC with NbC reduces hardness, while the substitution of Co with Ni in the NbC based cermets increases the $K_{IC}$, but reduced the hardness. However, the inventors have identified a set of laser shock peening (LSP) parameters that allows LSP to be performed successfully on brittle materials, such as cemented carbides and cermets. From the abovementioned discussion of the experimental results it can be seen that LSP was successfully performed on all the cermets, which resulted in an increased $K_{IC}$ while maintaining the hardness. After performing LSP on liquid phase sintered cermets, which initially had low $K_{IC}$ values in the region of 6 to 7 MPa·m$^{1/2}$, the $K_{IC}$ was doubled. The SPS cermets on the other hand have shown an increase in $K_{IC}$ of about 20 to 30% after LSP. The NbC—Ni cermets, which initially had high $K_{IC}$ values in the region of about 14 to 15 MPa·m$^{1/2}$, have shown the lowest increase in $K_{IC}$ of about 10%. Using rapid sintering, alteration of cermet composition and in particular LPS, it was shown that it is possible to maintain the hardness and improve the fracture toughness in cermets.

It is envisaged that the above-mentioned method in accordance with the invention could be used in the manufacturing or treating of tools manufactured from brittle materials such as cemented carbides and cermets. For example, the tools could be in the form of cutting elements, cutting element inserts, drilling tools, drilling tool inserts, mining tools, wear parts in the mining and machining industries or any other tool where hardness and fracture toughness are important criteria. By carrying out the abovementioned method, in particularly the step of performing LSP on a tool which has a core made from a cemented carbide or cermet material having a fracture toughness of between about 6 and 14 MPa·m$^{1/2}$, a toughened surface layer, which has an increased fracture toughness compared to the fracture toughness of the core, is obtained. The increased fracture toughness of the toughened surface layer acts to increase the tool's resistance to fracturing.

Effects of LSP on WC and NbC Cermet Based Inserts for Grey Cast Iron Face-Milling Cermet Insert Compositions and Mechanical Properties Cutting inserts were produced by conventional liquid phase sintering (LPS) and rapid spark plasma sintering (SPS). Two inserts per composition were produced. The investigated insert compositions are shown in Table 3 below. The mechanical properties of the inserts before and after LSP are shown in Table 4. Increased fracture toughness and a maintained value of hardness was observed in all insert compositions after LSP.

TABLE 3

Face-milling Inserts compositions

| Composition | Production | Symbol |
| --- | --- | --- |
| WC—8Co (wt %) | Liquid phase sintering | WC—8Co—L |
| WC—8Co (wt %) | Spark plasma sintering | WC—8Co—S |
| NbC—8Ni (wt %) | Spark plasma sintering | NbC—8Ni—S |
| NbC—4Mo$_2$C—8Ni (wt %) | Spark plasma sintering | NbC—Mo$_2$C—8Ni—S |

TABLE 4

Mechanical Properties of Inserts before and after LSP

| Insert | Vickers microhardness HV$_{30}$ (GPa) | Fracture toughness, $K_{IC}$ (MPa · $\sqrt{m}$) |
| --- | --- | --- |
| WC—8Co—L | 15.86 ± 0.12 | 10.06 ± 0.20 |
| WC—8Co—L [LP] | 15.94 ± 0.14 | 10.86 ± 0.21 |
| WC—8Co—S | 18.08 ± 0.15 | 9.50 ± 0.17 |
| WC—8Co—S [LP] | 18.14 ± 0.23 | 10.45 ± 0.19 |
| NbC—8Ni—S | 13.47 ± 0.12 | 6.52 ± 0.22 |
| NbC—8Ni—S [LP] | 13.35 ± 0.15 | 7.64 ± 0.18 |
| NbC—Mo$_2$C—8Ni—S | 14.06 ± 0.11 | 6.49 ± 0.10 |
| NbC—Mo$_2$C—8Ni—S [LP] | 14.17 ± 0.19 | 7.35 ± 0.12 |

LP* means the inserts were Laser peened

Investigated Face Milling Parameters

The produced inserts were tested under roughing, semi-finishing and finishing conditions to assess the effect of LSP during different stages of grey cast iron face-milling. The investigate parameters are shown in Table 5.

TABLE 5

Face-milling parameters

| Face-milling process | Cutting speed (m/minute) | Depth of cut (mm) | Spindle speed (rpm) | Feed rate (mm/minute) |
| --- | --- | --- | --- | --- |
| Roughing | 100 | 1.0 | 400 | 40 |
| Semi-finishing | 300 | 0.5 | 1200 | 120 |
| Finishing | 500 | 0.2 | 2000 | 200 |

Results

Figure 12:
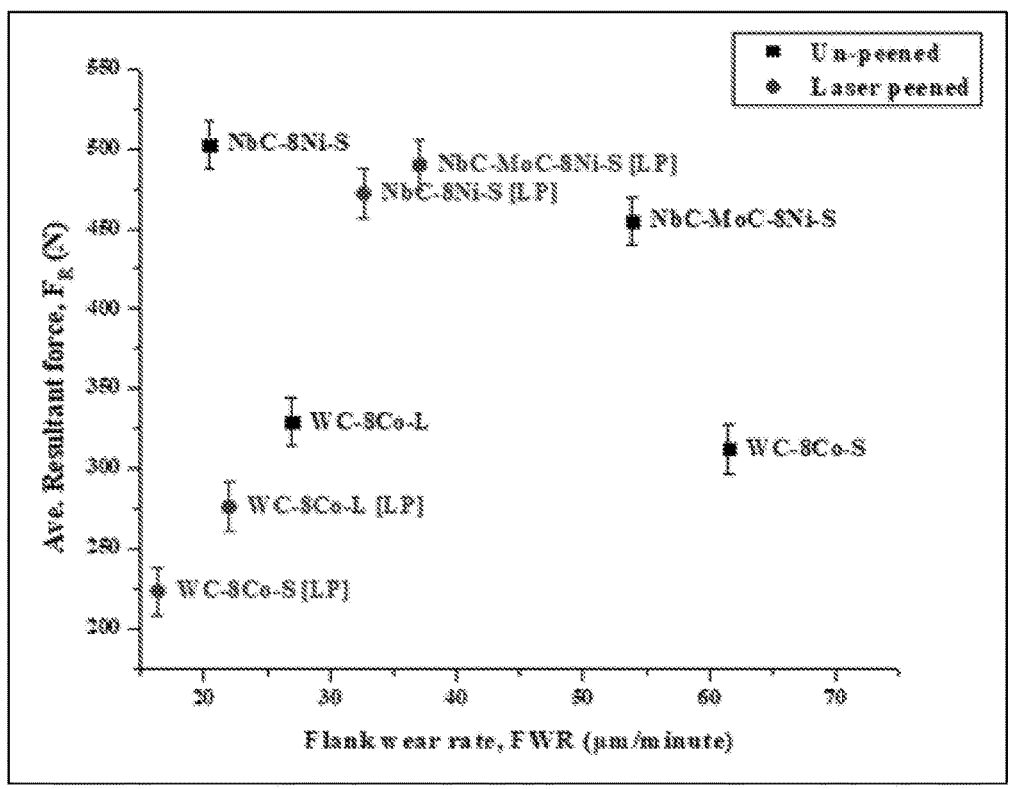
FIG. 12 illustrates the comparison between average resultant force (FR) and flank wear rate (FWR) during roughing at 100 m/minute at a depth of cut of 1 mm.
Figure 13:
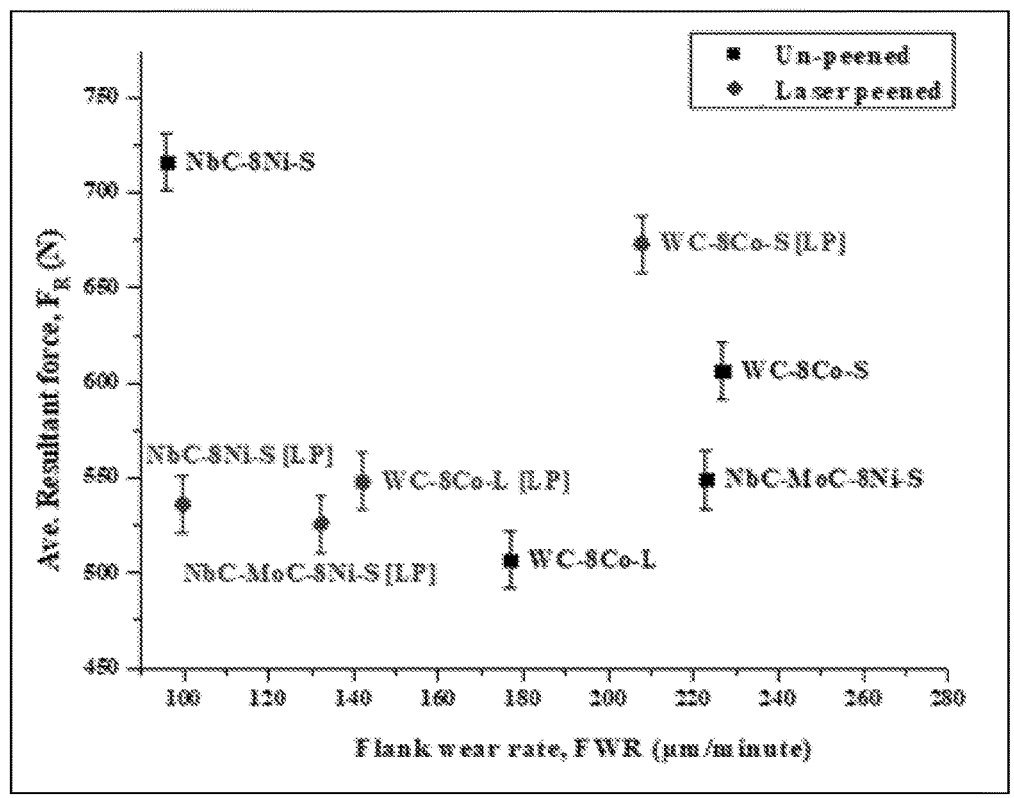
FIG. 13 illustrates the comparison between average resultant force (FR) and flank wear rate (FWR) during semi-finishing at 300 m/minute at a depth of cut of 0.5 mm.

FIG. 12 shows the comparison between flank wear rate (FWR) and average resultant force ($F_R$) during rough at 100 m/minute at a depth of cut of 1 mm. Apart from the NbC-8Ni—S [LP] insert that increased in FWR after LSP, all the other inserts had lower FWRs compared to similar compositions that were not treated by LSP, indicating improved tool life of these inserts. The un-peened NbC-8Ni—S insert had the lowest FWR compared to other un-peened inserts. The improved performance was attributed to the induced compressive residual stress and higher fracture toughness on the cutting edges of the inserts. Similarly, during semi-finishing at 300 m/min (FIG. 13), all the laser peened inserts apart from the NbC-8Ni—S [LP] insert had lower FWRs compared to similar compositions that were not peened, further indicating improved tool life due to LSP.

From the grey cast iron face-milling tests it can be seen that a cutting tool treated in accordance with the method of the invention has an improved life. From the above tests it is concluded that the improved life is as a result of the increased fracture toughness and not due to an increase in microhardness resulting from a change in microstructure of the cemented carbide. The increase in life of the cutting tool is achieved despite a negligible increase in microhardness.

A significant deviation of the method of the present invention from the prior art methods is that the method of the invention focusses on fracture toughness instead of hardness. The method in accordance with the invention is not concerned with changes in the microhardness of the cemented carbide. It is believed that the increase in fracture toughness is achieved using the method of the invention, focused on the generation of compressive residual stresses, without changing the microstructure of the cemented carbide. This is in contrast to prior art methods that use high powered laser beams specifically to change the microstructure of the cemented carbide so as to increase the microhardness. This change in methodology away from a focus on hardness improvement has resulted in the method in accordance with the invention selecting a cemented carbide based on its fracture toughness.

It will be appreciated that the above is only some exemplified embodiments of the invention and that there may be many variations without departing from the spirit and/or the scope of the invention. It is easily understood from the present application that the particular features of the present invention, as generally described and/or illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

The invention claimed is:

1. A method of improving the wear resistance of a cemented carbide, the method including:
    selecting a cemented carbide which has a fracture toughness value between about 6 and about 15 MPa·m$^{1/2}$;
    applying a sacrificial thermo-protective overlay to the cemented carbide; and
    creating a toughened surface layer by inducing residual compressive stresses in a substrate of the cemented carbide using laser shock peening with a laser source capable of delivering between about 300 mJ to about 600 mJ to the cemented carbide at a pulse duration of between about 7 ns and about 10 ns (FWHM), a spot size between about 0.7 and about 1.2 mm, a power intensity of between about 7.5 and about 8.5 GW/cm$^2$, and an overlap of between 0 and 90%, wherein the laser shock peening increases the fracture resistance to fatigue and stress corrosion cracking in the toughened surface layer as a result of an increase in fracture toughness while maintaining microhardness.

2. A method according to claim 1, further comprising delivering between about 410 mJ to about 440 mJ to the substrate of the cemented carbide during laser shock peening.

3. A method according to claim 1, wherein a pulse duration of about 8.6 ns (FWHM) is used during laser shock peening.

4. A method according to claim 1, wherein a power Intensity of between about 7.5 and about 8.5 GW/cm$^2$ is used during laser shock peening.

5. A method according to claim 1, wherein the sacrificial overlay is black PVC tape.

6. A method according to claim 1, further comprising using an inertia containment medium during laser shock peening, wherein the inertial containment medium is a laser transparent medium.

7. A method according to claim 6, wherein the laser transparent medium is water.

8. A method according to claim 1, further comprising producing the cemented carbide by means of spark plasma sintering.

9. A method according to claim 1, wherein the cemented carbide is selected from the group consisting of WC-X-YCo, NbC-X-YCo and NbC-X-YNi, where X is either one or a combination of $Cr_3C_2$, $Mo_2C$, TiC, SiC, TaC and VC, and Y is the weight percentage of a binder phase and is in the range 4 to 16%.

10. A method according to claim 9, wherein Y is the weight percentage of the binder phase and is in the range 8 to 10%.

11. A method of improving the wear resistance of a cemented carbide insert of a cutting tool using the method according to claim 1.

* * * * *